US010739457B1

(12) United States Patent
Inoue et al.

(10) Patent No.: US 10,739,457 B1
(45) Date of Patent: Aug. 11, 2020

(54) LASER RADAR, AND LIGHT RECEIVING METHOD OF LASER RADAR

(71) Applicant: KABUSHIKI KAISHA TOYOTA CHUO KENKYUSHO, Nagakute-shi, Aichi-ken (JP)

(72) Inventors: Daisuke Inoue, Nagakute (JP); Tadashi Ichikawa, Nagakute (JP); Tatsuya Yamashita, Nagakute (JP); Akari Nakao, Nagakute (JP); Kazuo Hasegawa, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 1302 days.

(21) Appl. No.: 14/944,815

(22) Filed: Nov. 18, 2015

(30) Foreign Application Priority Data

Nov. 19, 2014 (JP) .................................. 2014-234987

(51) Int. Cl.
   *G01S 17/34* (2020.01)
   *G01S 17/32* (2020.01)
   *G01S 17/02* (2020.01)

(52) U.S. Cl.
   CPC .............. *G01S 17/34* (2020.01); *G01S 17/02* (2013.01); *G01S 17/32* (2013.01)

(58) Field of Classification Search
   CPC .. G01C 3/08; G01P 3/36; G01B 11/14; G01S 17/34
   See application file for complete search history.

(56) References Cited

U.S. PATENT DOCUMENTS 6,580,497 B1   6/2003 Asaka et al.
2006/0227317 A1 * 10/2006 Henderson ........... G01B 11/026
                                                                    356/28

(Continued)

FOREIGN PATENT DOCUMENTS

JP    S61-198930 U    12/1986
JP    H02-67986 A     3/1990

(Continued)

OTHER PUBLICATIONS

Feb. 6, 2018 Office Action issued in Japanese Patent Application No. 2015-225817.

*Primary Examiner* — Luke D Ratcliffe
(74) *Attorney, Agent, or Firm* — Oliff PLC

(57) ABSTRACT

A laser radar device includes: a light source; a projection light scanner that scans one part of light split off from emission light of the light source, and that generates transmission light for radiating onto a target object; an image forming section that forms plural respective reception lights of the transmission light reflected by respective locations of the target object into an image on a single flat plane as plural image-formation points; an optical receiver that is disposed at the plural image-formation points, and that includes plural unit optical reception sections for mixing each of the plural reception lights together with a reference light and performing optical heterodyne detection; and a reference light scanner that scans or distributes another light split off from the emission light from the light source, and that generates the reference light for radiating onto each of plural of the unit optical reception sections.

16 Claims, 15 Drawing Sheets

(56) References Cited

U.S. PATENT DOCUMENTS

| | | | | |
|---|---|---|---|---|
| 2011/0037965 A1* | 2/2011 | Hintz | ............... | G01S 7/4802 |
| | | | | 356/4.01 |
| 2011/0176142 A1 | 7/2011 | Hacker et al. | | |
| 2015/0185244 A1 | 7/2015 | Inoue et al. | | |
| 2015/0346340 A1* | 12/2015 | Yaacobi | ............ | G01S 17/36 |
| | | | | 356/5.11 |
| 2015/0377964 A1* | 12/2015 | Patukuri | ............ | G01S 17/02 |
| | | | | 356/5.01 |

FOREIGN PATENT DOCUMENTS

| | | | |
|---|---|---|---|
| JP | H06-59038 | A | 3/1994 |
| JP | 2000-338243 | A | 12/2000 |
| JP | 2001-272334 | A | 10/2001 |
| JP | 2001-330558 | A | 11/2001 |
| JP | 2002-051357 | A | 2/2002 |
| JP | 2011-528111 | A | 11/2011 |

\* cited by examiner

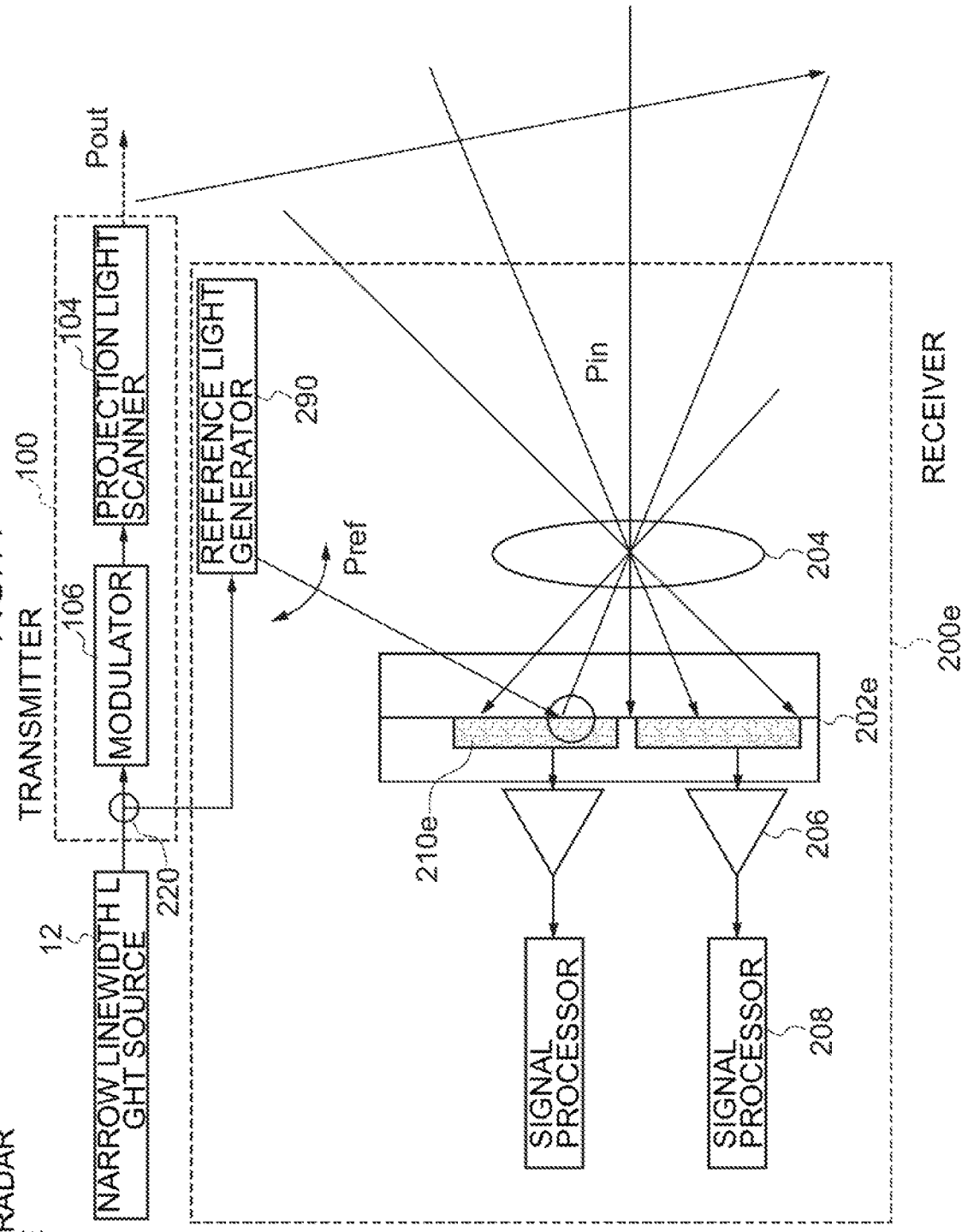

LASER RADAR, AND LIGHT RECEIVING METHOD OF LASER RADAR

CROSS-REFERENCE TO RELATED APPLICATION

This application is based on and claims priority under 35 USC 119 from Japanese Patent Application No. 2014-234987 filed on Nov. 19, 2014, the disclosure of which is incorporated by reference herein.

BACKGROUND

Technical Field

The present invention relates to a laser radar device and an optical reception method for a laser radar device.

Related Art

A laser radar device is a type of remote sensing technology that employs light, and is a device in which the distance to a faraway target object, properties of the target object, and the like are analyzed by radiating light from pulse-emitting light projector onto the target object, and measuring scattered light that has been reflected by the target object and received by an optical receiver.

Examples of such laser radar devices include a device described by Japanese Patent Application Laid-Open (JP-A) No. 2000-338243. The laser radar device described by JP-A No. 2000-338243 includes an optical modulator that modulates laser light from a continuous wave (CW) laser, an optical antenna that radiates the modulated laser light toward a target (subject) as transmission light and receives scattered light from the target, a mixing means that mixes laser light from the CW laser that has been split by a splitting means as local light, together with light received from the optical antenna, and an optical detector that detects the mixed light by optical heterodyne detection.

JP-A No. 2001-272334 describes a system that performs two-dimensional optical heterodyne scanning detection. The two-dimensional optical heterodyne scanning detection system described by JP-A No. 2001-272334 includes a pixel array of arrayed photodiodes produced on a semiconductor substrate, a two-dimensionally arrayed photo-detector in which MOS transistors that sequentially read signal charges of the pixel array are pixel arrayed, a scanning section that scans the two-dimensional photo-detector, and a wave detecting circuit that processes an output signal from the two-dimensional detection device.

When two two-dimensional light waves having optical frequencies that differ by an amount f are incident to the two-dimensional photo-detector, a two-dimensional light intensity distribution that varies with time at a frequency f is produced on the two-dimensional photo-detector based on a heterodyne beat signal, and the amplitude of the intensity distribution is detected by the wave detecting circuit.

In a laser radar device according to conventional technology such as that described in JP-A No. 2000-338243, a device is generally required for scanning projected light or reception light. There is generally a scanning means such as a mirror or a prism, particularly at the targeted reception side, which is particularly objected to in the present invention. Issues related to reliability are liable to arise in such cases, since the mirror or prism includes movable components. Moreover, there is also an issue in configurations using a mirror or prism in that optical defects may arise, leading to a reduction in reception sensitivity.

The two-dimensional optical heterodyne scanning detection system described by JP-A No. 2001-272334 is a device that detects a spatial beat signal using a low coherence light source, and addresses high-speed reading of electrical charges based on light intensity of incident light arising in a two-dimensional photo-detector. Thus this device does not directly contribute to enhancing reception sensitivity that is one attribute demanded in a laser radar device.

SUMMARY

In consideration of the above issues, an object of the present invention is to implement a laser radar device with which high sensitivity measurements are possible and that is highly reliable, and to implement an optical reception method for a laser radar device of the same.

In order to achieve the above object, a laser radar device of a first aspect of the present invention includes: a light source; a projection light scanner that scans one part of light split off from emission light of the light source, and that generates transmission light for radiating onto a target object; an image forming section that forms plural respective reception lights of the transmission light reflected by respective locations of the target object into an image on a single flat plane as plural image-formation points; an optical receiver that is disposed at the plural image-formation points, and that includes plural unit optical reception sections for mixing each of the plural reception lights together with a reference light and performing optical heterodyne detection; and a reference light scanner that scans or distributes another light split off from the emission light of the light source, and that generates the reference light for radiating onto each of the plural unit optical reception sections.

A second aspect of the present invention is the first aspect, wherein the reference light scanner switches between guiding and not guiding the other light using plural optical switches provided between the light source and the plural unit optical reception sections, and that generates the reference light for scanning and radiating onto the plural respective unit optical reception sections.

A third aspect of the present invention is the second aspect, wherein plural respective optical switches are each provided to plural of the unit optical reception sections.

A fourth aspect of the present invention is the second aspect, wherein the plural unit optical reception sections are disposed in an array on the optical receiver, and the plural optical switches are each provided to each row or to each column of the array.

A fifth aspect of the present invention is the first aspect, wherein the reference light scanner includes plural light emitters that emit respective distribution lights distributed from the other light so as to correspond to the plural respective unit optical reception sections, and the reference light scanner distributes the other light and generates the reference light for radiating onto the plural respective unit optical reception sections.

A sixth aspect of the present invention is the first aspect, wherein the plural respective unit optical reception sections are configured including an optical incidence section to which the reception light is incident, an optical multiplexer that multiplexes the reception light from the optical incidence section and the reference light, and an optical detection element that receives the light multiplexed by the optical multiplexer.

A seventh aspect of the present invention is the first aspect, wherein: the reference light scanner includes a variable phase shifter that shifts the phase of the other light according to an external signal, and a reference light generator including plural unit reference light generators that include a light emitter for emitting light that has been phase shifted by the variable phase shifter; and the reference light scanner controls the direction of a wave front of multiplexed emission light emitted from the plural light emitters by controlling the phase shift amount in each of the plural variable phase shifters, and scans the emission light by switching which of the plural unit optical reception sections the emission light is radiated onto.

An eighth aspect of the present invention is the seventh aspect, wherein plural of the unit reference light generators are disposed in an array on the reference light generator, and the plural variable phase shifters phase shift each row or each column of the array by a determined amount.

A ninth aspect of the present invention is the first aspect, further including a detector that detects at least one out of amplitude or phase of the reception light for each of the plural optical receivers based on a signal optical-heterodyne detected by the optical receiver.

A tenth aspect of the present invention is the first aspect, further including plural sets of the image forming section and the optical receiver.

An eleventh aspect of the present invention is the first aspect, wherein each of the plural unit optical reception sections mixes the plural respective reception lights with a corresponding reference light and performs optical heterodyne detection.

A twelfth aspect of the present invention is the first aspect, wherein each of the plural unit optical reception sections mixes the reference light with reception lights from a specific number of the plural reception lights, and performs optical heterodyne detection.

In order to achieve the above object, in an optical reception method for a laser radar device of a thirteenth aspect of the present invention, the laser radar device method includes: a light source; a projection light scanner that scans one part of light split off from emission light of the light source, and that generates transmission light for radiating onto a target object; and a reference light scanner that scans another light split off from the emission light from the light source, and that generates the reference light for radiating onto each of the plural unit optical reception sections, wherein the optical reception method includes: forming an image on a single flat plane as plural image-formation points, from plural respective reception lights that are the transmission light reflected by respective locations of the target object; and mixing each of the plural reception lights with the reference light and performing optical heterodyne detection using the plural unit optical reception sections disposed at the plural image-formation points.

According to the present invention, an advantageous effect is exhibited of high sensitivity measurement being possible when implementing a highly reliable laser radar device and an optical reception method of a laser radar device.

BRIEF DESCRIPTION OF THE DRAWINGS

FIG. 14 is a block diagram illustrating an example of a configuration of a laser radar device according to a seventh exemplary embodiment.

DETAILED DESCRIPTION

Figure 1:
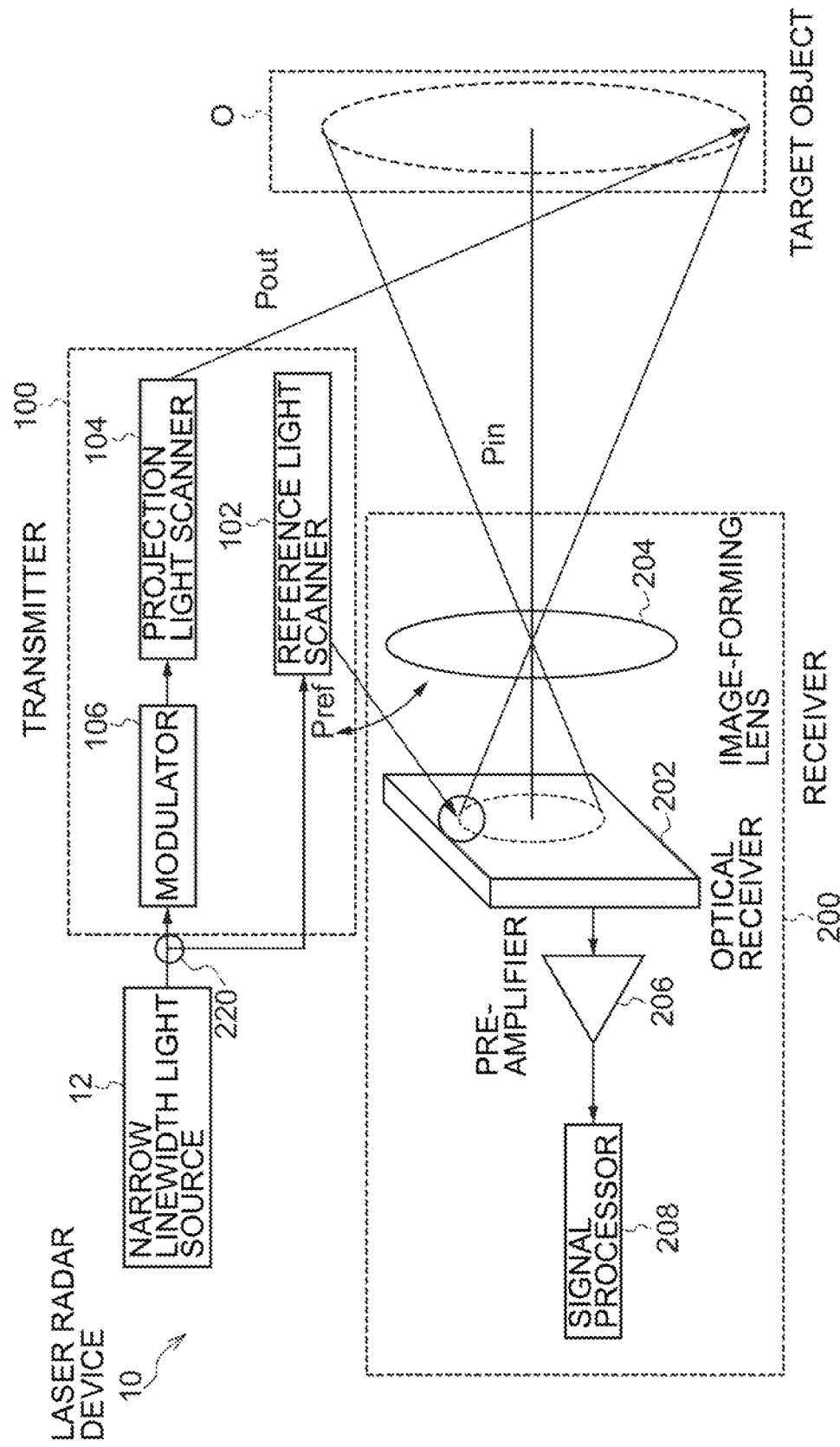
FIG. 1 is a block diagram illustrating an example of a configuration of a laser radar device according to an exemplary embodiment.

Detailed explanation follows regarding an exemplary embodiment the present invention, with reference to the drawings. First, explanation follows regarding basic configuration of a laser radar device 10 according to the present invention, with reference to FIG. 1.

The laser radar device 10 includes a transmitter 100, a receiver 200, a narrow linewidth light source 12, and an optical splitter 220. The transmitter 100 is configured including a reference light scanner 102, a modulator 106, and a projection light scanner 104. The receiver 200 is configured including an image-forming lens 204, an optical receiver 202, a pre-amplifier 206, and a signal processor 208.

As an example, the narrow linewidth light source 12 is a laser that generates CW light, and is a light source that generates a transmission light Pout radiating from the transmitter 100, and generates a reference light Pref for optical heterodyne detection.

The transmitter 100 generates the transmission light Pout for radiating toward a target object O. The modulator 106 of the transmitter 100 modulates one part of light split off from the light output of the narrow linewidth light source 12 by the optical splitter 220, and supplies the modulated light to the projection light scanner 104. Modulation by the modulator 106 is modulation to acquire the correlation between reception light Pin that is reflected (scattered) by the target object O and incident to the receiver 200, and the transmission light Pout, and employs, for example, modulation using a pseudorandom number pattern (PN pattern), modulation using a sine wave, or the like. The projection light scanner 104 of the transmitter 100 scans such that the light modulated by the modulator 106 is radiated toward the target object O.

The receiver 200 receives, as the reception light Pin, light that is emitted from the transmitter 100 as transmission light Pout and then reflected (scattered) by the target object O. The image-forming lens 204 of the receiver 200 forms an image of the target object O on the optical receiver 202 using the reception light Pin. The optical receiver 202 is an optical reception element provided with plural arrayed unit optical reception sections 210 that each include a photodiode 212 (see FIG. 2 etc.), and an image of the target object O is formed on the surface of the optical reception elements such that the optical reception elements correspond to respective portions of the target object O. To reflect this meaning, optical reception faces of each of the unit optical reception sections 210 (photodiodes 212) are sometimes referred to as "image-forming points", and the optical reception element surface configured by the unit optical reception sections 210 is sometimes referred to as a "focal plane array".

In the laser radar device 10, reference light Pref that is switching controlled by the reference light scanner 102 is incident to each of the unit optical reception sections 210 (the photodiodes 212), together with reception light Pin corresponding to respective portions of the target object O. The reference light scanner 102 of the laser radar device 10 controls by switching whether or not the reference light Pref is caused to be incident to each of the plural unit optical reception sections 210. Namely, in the laser radar device 10 of the present exemplary embodiment, reception light Pin corresponding to respective portions of the target object O is formed as an image on the focal plane array without scanning the reception light Pin, and the reference light Pref is caused to be incident to each image forming point while being switched (while being scanned).

In the laser radar device 10, intermediate frequencies are produced by interference between the reception light Pin and the reference light Pref, and optical heterodyne detection is performed in each of the unit optical reception sections 210 (namely, on the focal plane array). Namely, a beat signal of the reception light Pin and the reference light Pref is output from each of the unit optical reception sections 210 as an electrical signal. The electrical signals output from the optical receiver 202 are sent to the signal processor 208 through pre-amplifiers 206. In the signal processor 208, specific arithmetic processing is performed on the beat signal, and at least one out of amplitude or phase of the reception light Pin corresponding to respective portions of the target object O is detected. The distance to the target object O, the travelling speed of the target object O, or the like, is calculated from information indicating at least one out of the detected amplitude or phase of the reception light Pin.

In this manner, in the laser radar device 10 according to the present invention, configuration is made such that the reception light Pin is input to the optical receiver 202 as directly as possible (without passing through a scanner or the like). Thus, in the laser radar device 10, the reception light Pin reflected by the respective portions of the target object O is formed as an image by the optical receiver 202 as a focal plane array, and the reference light Pref is scanned so as to be caused to be incident to each image-formation point. While the light intensity of the reception light Pin is generally weak, the light intensity of the reference light Pref can be amplified if necessary; and the light intensity of the reference light Pref may be made so as to always be constant. This enables high sensitivity measurements in the laser radar device 10 according to the present invention.

Although explanation follows regarding an example of a mode in which the reference light scanner 102 in the laser radar device 10 is switching controlled (scanned) such that the reference light Pref is sequentially incident to each of the unit optical reception sections 210 (for example, so as to be incident to each row in turn), there is no limitation thereto, and the switching control may be performed such that the reference light Pref is incident in whichever sequence. Moreover, it is not particularly necessary for switching control to be performed such that the reference light Pref is incident to one unit optical reception section 210 each time, and switching control may be performed such that the reference light Pref is incident to plural individual unit optical reception sections 210 each time.

Moreover, although explanation is given in the exemplary embodiments regarding examples of a mode in which optical heterodyne detection is performed in a receiver with signals of reception light Pin and reference light Pref that differ from each other in terms of properties of modulation or the like, there is no limitation thereto, and a mode may be employed in which homodyne detection is performed with signals of reception light Pin and reference light Pref having the same properties as each other.

First Exemplary Embodiment

Figure 2:
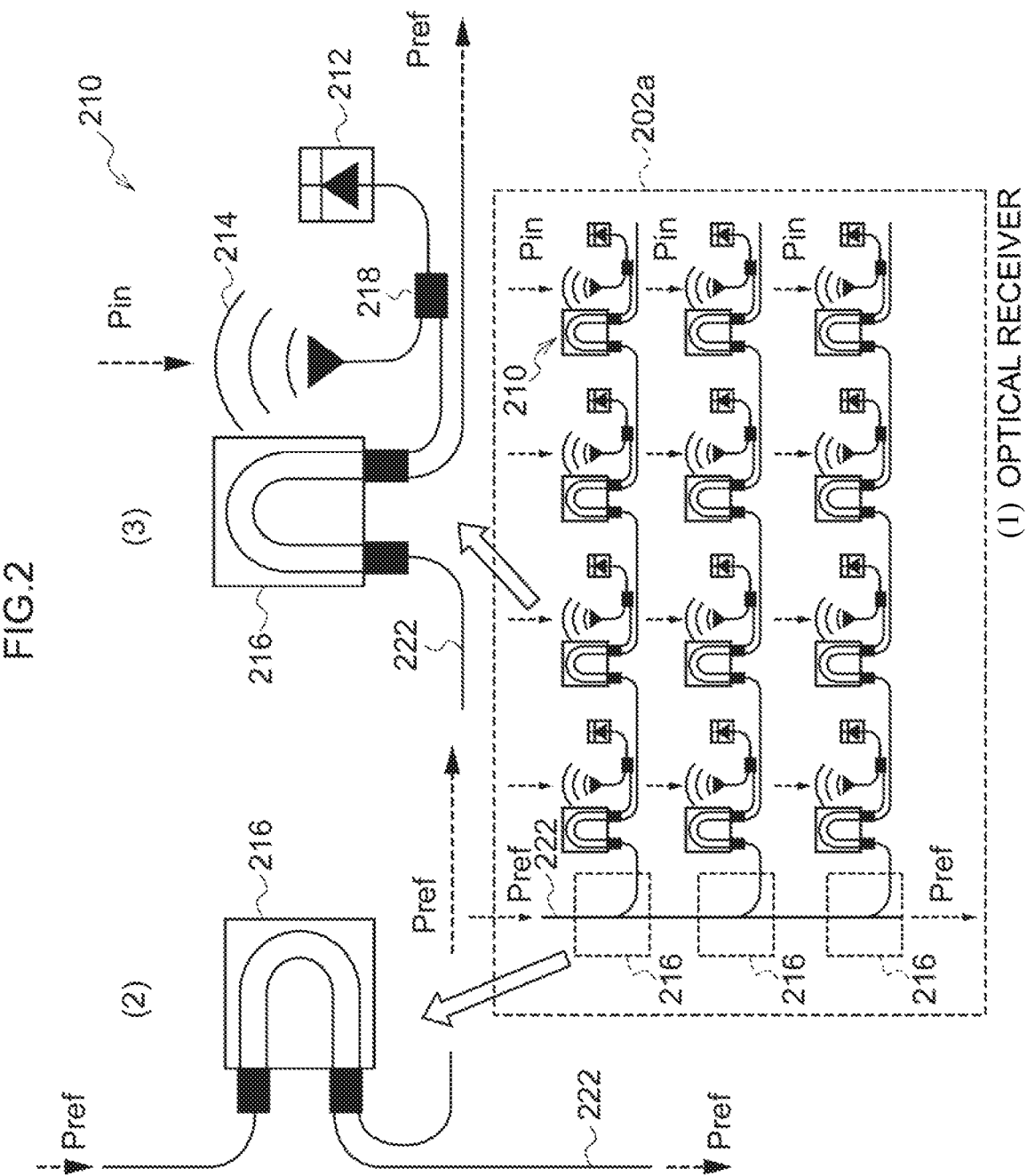
FIG. 2 is a diagram illustrating an example of a configuration of an optical receiver according to a first exemplary embodiment.
Figure 3:
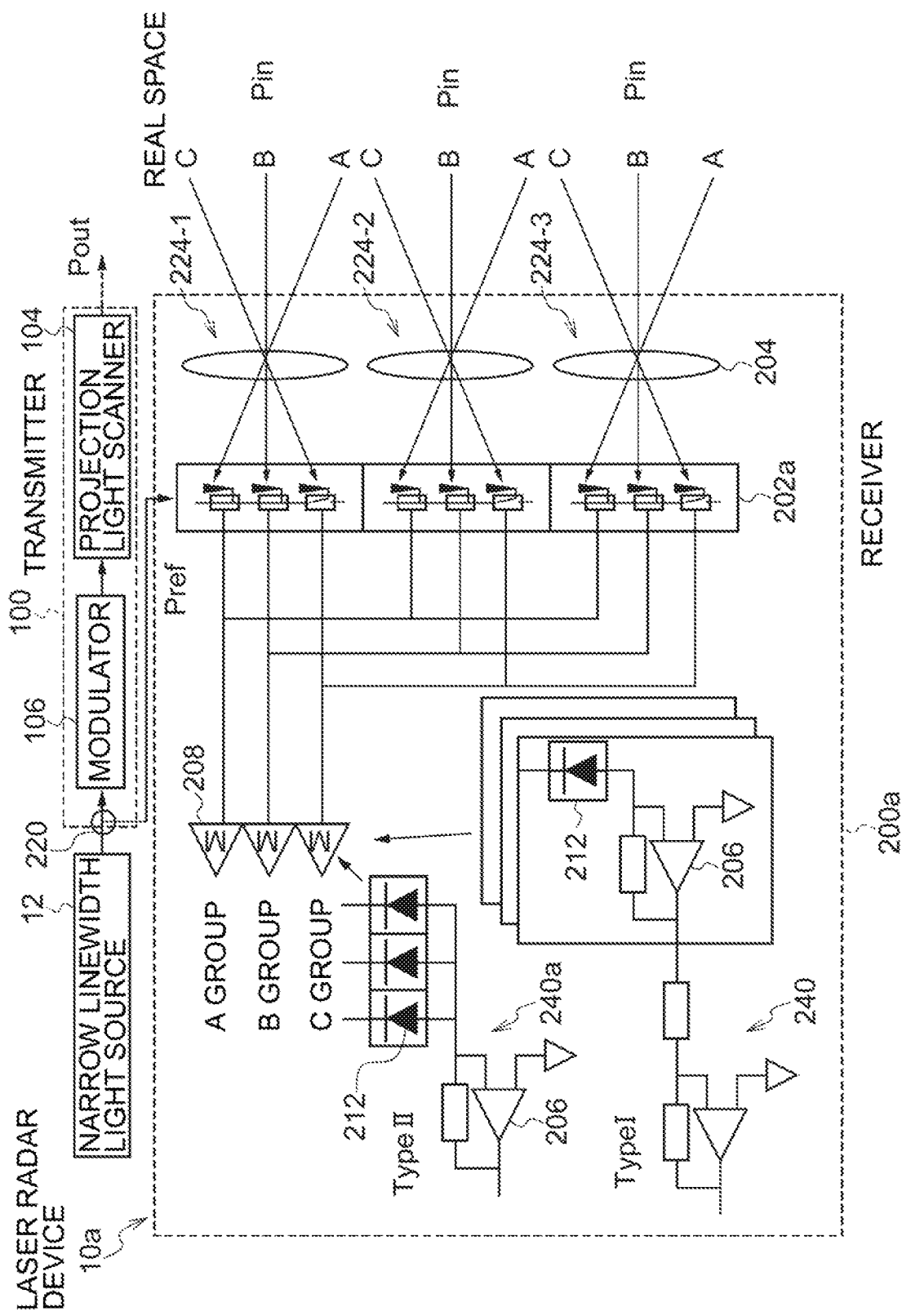
FIG. 3 is a block diagram illustrating an example of a configuration of a laser radar device according to the first exemplary embodiment.
Figure 4:
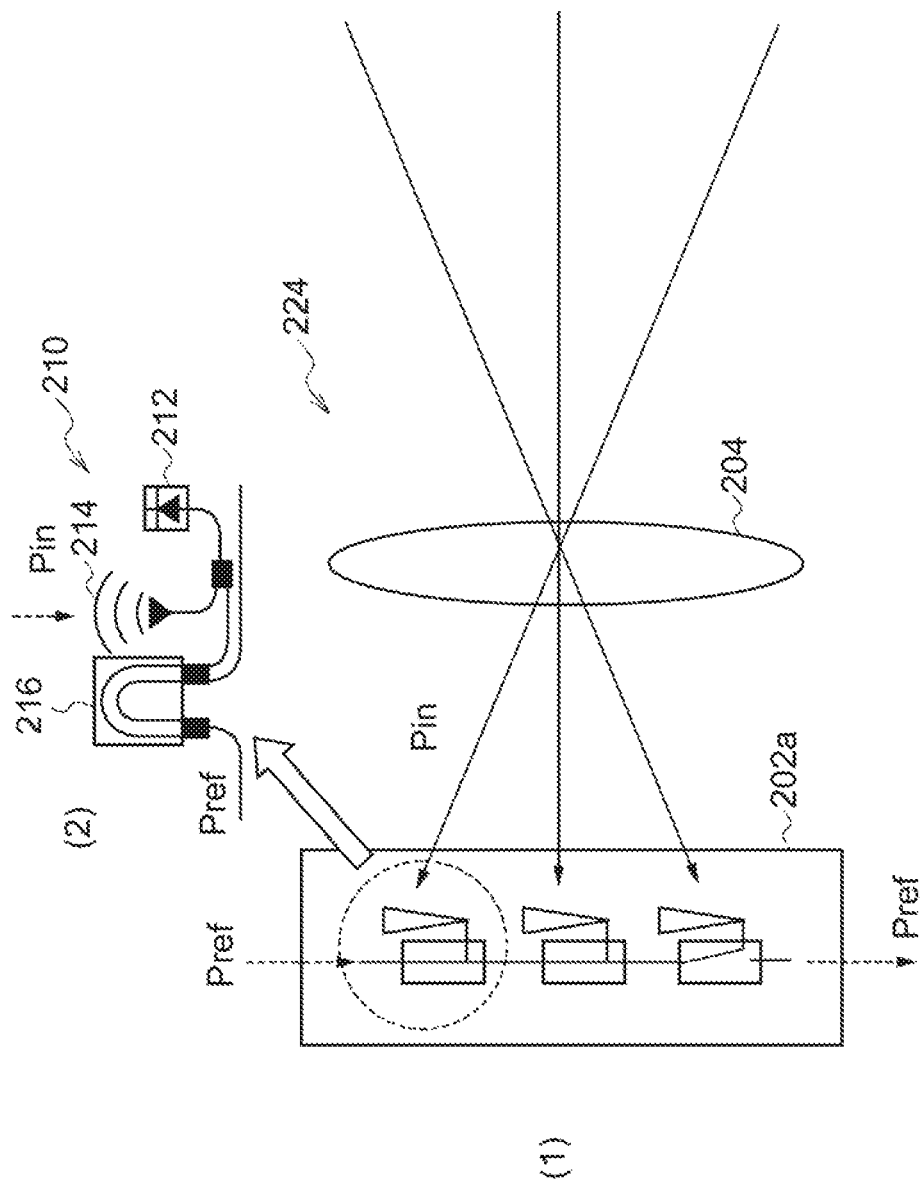
FIG. 4 is diagram illustrating an example of a configuration of an image-forming optical receiver according to the first exemplary embodiment.

Explanation follows regarding a laser radar device 10a according to an exemplary embodiment, with reference to FIG. 2 to FIG. 4.

First, explanation follows regarding an optical receiver 202a according to the present exemplary embodiment, with reference to FIG. 2. As illustrated in (1) of FIG. 2, the optical receiver 202a includes plural of the unit optical reception sections 210 disposed in an array. The number of the unit optical reception sections 210 that configure the optical receiver 202a is, as an example, 50×50=2500 units. However, only 3×4=12 units thereof are illustrated in (1) of FIG. 2.

As illustrated in (1) of FIG. 2, the reference light Pref incident from one end of an optical waveguide 222 is switching controlled between guiding and not guiding by an optical switch 216 illustrated in (2) of FIG. 2, and is distributed to the respective unit optical reception sections 210. Reception light Pin corresponding to each portion of the target object O is incident to the photodiode 212 of each respective unit optical reception section 210. The configuration of the optical switch 216 employed by the optical receiver 202a according to the present exemplary embodiment is not particularly limited, and any optical switch, such as a thermo optical switch or a mechanical optical switch, may be employed.

As illustrated in (1) of FIG. 2, in the present exemplary embodiment, each of the unit optical reception sections 210 is provided with an optical switch 216, and the optical switches 216 switching control whether or not the reference light Pref is caused to be incident to each of the photodiodes 212 in the unit optical reception sections 210. Namely, in the present exemplary embodiment, the plural optical switches 216 configure the reference light scanner 102 illustrated in FIG. 1.

Next, detailed explanation follows regarding the unit optical reception section 210, with reference to (3) of FIG. 2. The unit optical reception section 210 according to the present exemplary embodiment includes the photodiode 212, a grating coupler 214, the optical switch 216, and an optical multiplexer 218.

The grating coupler 214 is configured by using periodic refractive index modulation (an optical waveguide grating) provided on the optical waveguide surface to efficiently incorporate the reception light Pin into the optical waveguide 222. The grating coupler 214 may also be employed in reverse in cases in which light is caused to efficiently emanate from the optical waveguide 222 (see FIG. 12).

The photodiode 212 receives the reception light Pin corresponding to respective portions of the target object O and the reference light Pref that have been multiplexed by the optical multiplexer 218, superimposes the two, and outputs an optical heterodyne detected electrical signal.

The optical switch 216 switches as to whether or not the reference light Pref is caused to be incident to the photodiode 212.

Next, explanation follows regarding the laser radar device 10a according to the present exemplary embodiment, with reference to FIG. 3. The laser radar device 10a includes the narrow linewidth light source 12, the transmitter 100, and a receiver 200a. The narrow linewidth light source 12 and the transmitter 100 are similar to those illustrated in FIG. 1.

The receiver 200a according to the present exemplary embodiment is configured including three systems of the image-formation optical receivers 224 each including a combination of the same optical receiver 202a and the same image-forming lens 204. In the drawing, A, B, and C represent respective portions of the target object O (labelled "real space" in FIG. 3), and light reflected by the respective portions A, B, C are incident as the reception light Pin to respective image-formation optical receivers 224-1, 224-2, 224-3.

The configuration of the three image-formation optical receiver 224 systems configured by the receivers 200a is adopted in order to allow the light intensity of reception light Pin to be increased, and more preferably image-formation optical receivers 224 are laid out in an array may be employed by using a microlens array as the image-forming lens 204. The number of image-formation optical receiver 224 arrays is not limited to three systems; the number may be set appropriately, and may, for example, be approximately 7×7. Obviously, a mode employing a single image-formation optical receiver 224 (for example, see FIG. 8) may be adopted when the light intensity of reception light Pin is not an issue.

FIG. 4 illustrates a configuration of one of the image-formation optical receivers 224. The optical receiver 202a of the image-formation optical receiver 224 is illustrated in FIG. 2, and switching as to whether or not the reference light Pref is caused to be incident to each unit optical reception section 210 is performed by the optical switch 216.

With reference to FIG. 3 again, the received electrical signals that were output from the three image-formation optical receivers 224 are input to the three signal processors 208 of the respective unit optical reception sections 210 (labelled "A group", "B group", and "C group" in FIG. 3) after combination in the respective unit optical reception sections 210.

The processing by the signal processor 208 may be processing by a separate reception circuit 240 for each of the image-formation optical receivers 224 (labelled "Type I" in FIG. 3), or may be processing by a single reception circuit 240a on the collective outputs of the image-formation optical receivers 224 (labelled "Type II" in FIG. 3).

As described above, the laser radar device 10a according to the present exemplary embodiment scans the reference light Pref for mixing with the reception light Pin to perform optical heterodyne detection, such that high sensitivity measurement is possible, and such that a laser radar device having high reliability can be implemented.

Second Exemplary Embodiment

Figure 5:
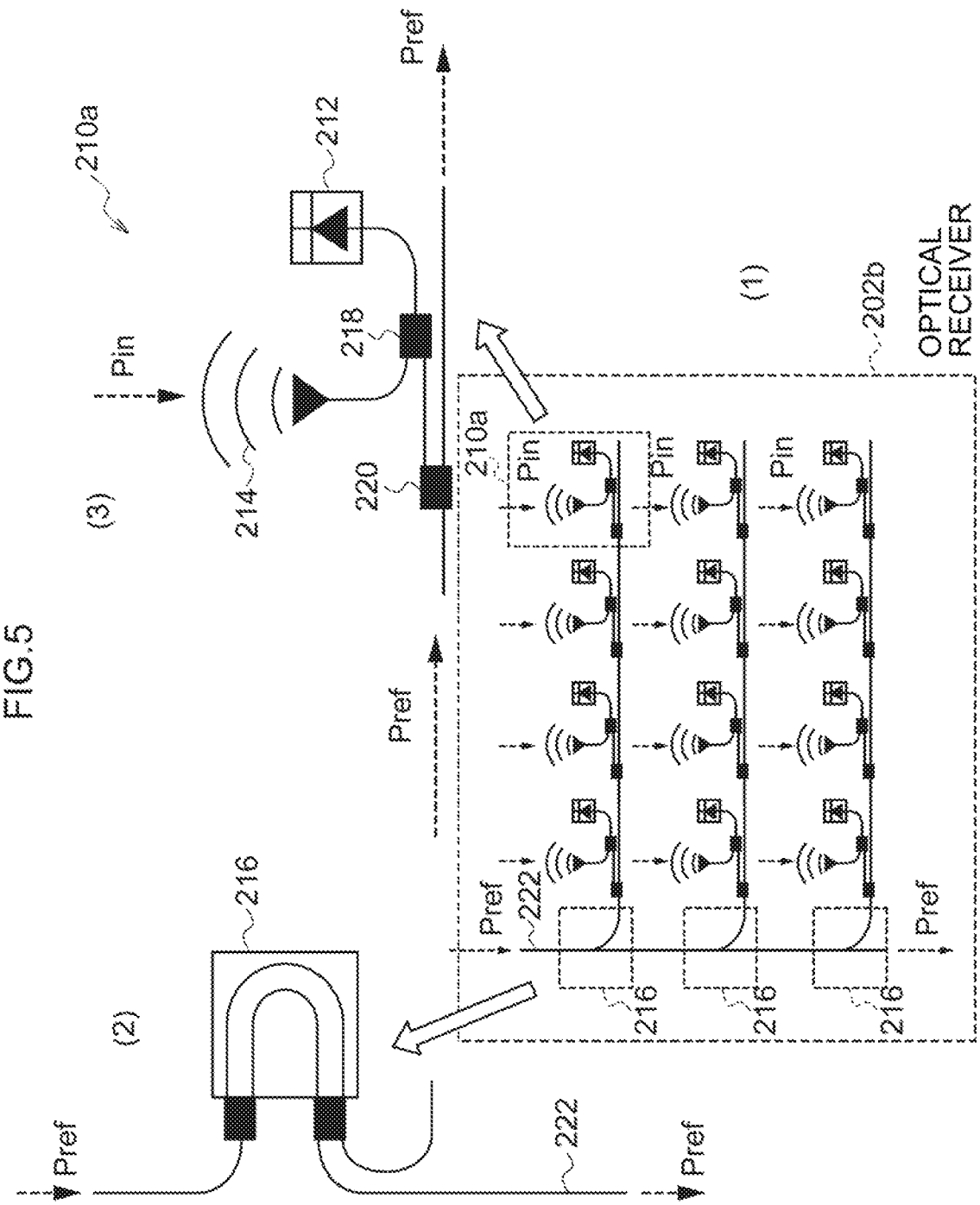
FIG. 5 is a diagram illustrating an example of a configuration of an optical receiver according to a second exemplary embodiment.

Explanation follows regarding the laser radar device 10 according to the present exemplary embodiment, with reference to FIG. 5. The present exemplary embodiment is a mode that employs an optical receiver 202b as the optical receiver 202 of the laser radar device 10 illustrated in FIG. 1.

As illustrated in FIG. 5, the optical receiver 202b employs optical receivers 210a that are obtained by removing the optical switch 216 from the unit optical reception section 210 in place of the unit optical reception sections 210 of the optical receiver 202a illustrated in (1) of FIG. 2.

The optical receiver 202a illustrated in (1) of FIG. 2 is a mode that switches as to whether or not the reference light Pref is caused to be incident to each of the photodiodes 212; however, in the optical receiver 202b a mode is adopted in which the optical switches 216, disposed at a left end, switch as to whether or not the reference light Pref is caused to be incident to each of the arrayed photodiodes 212. Namely, the optical switches 216 disposed at the left end of the optical receiver 202b in the present exemplary embodiment configure the reference light scanner 102 illustrated in FIG. 1. Note that although explanation is given regarding an example in which switching is performed in row units of the arrayed photodiodes 212 in the present exemplary embodiment, there is no limitation thereto, and switching may be performed in column units.

In the optical receiver 202b according to the present exemplary embodiment, it is necessary to separate the signals of photodiodes 212 that are in the same row using electrical circuits subsequent to the pre-amplifier 206; however, the number of the optical switches 216 can be reduced.

Third Exemplary Embodiment

Figure 6:
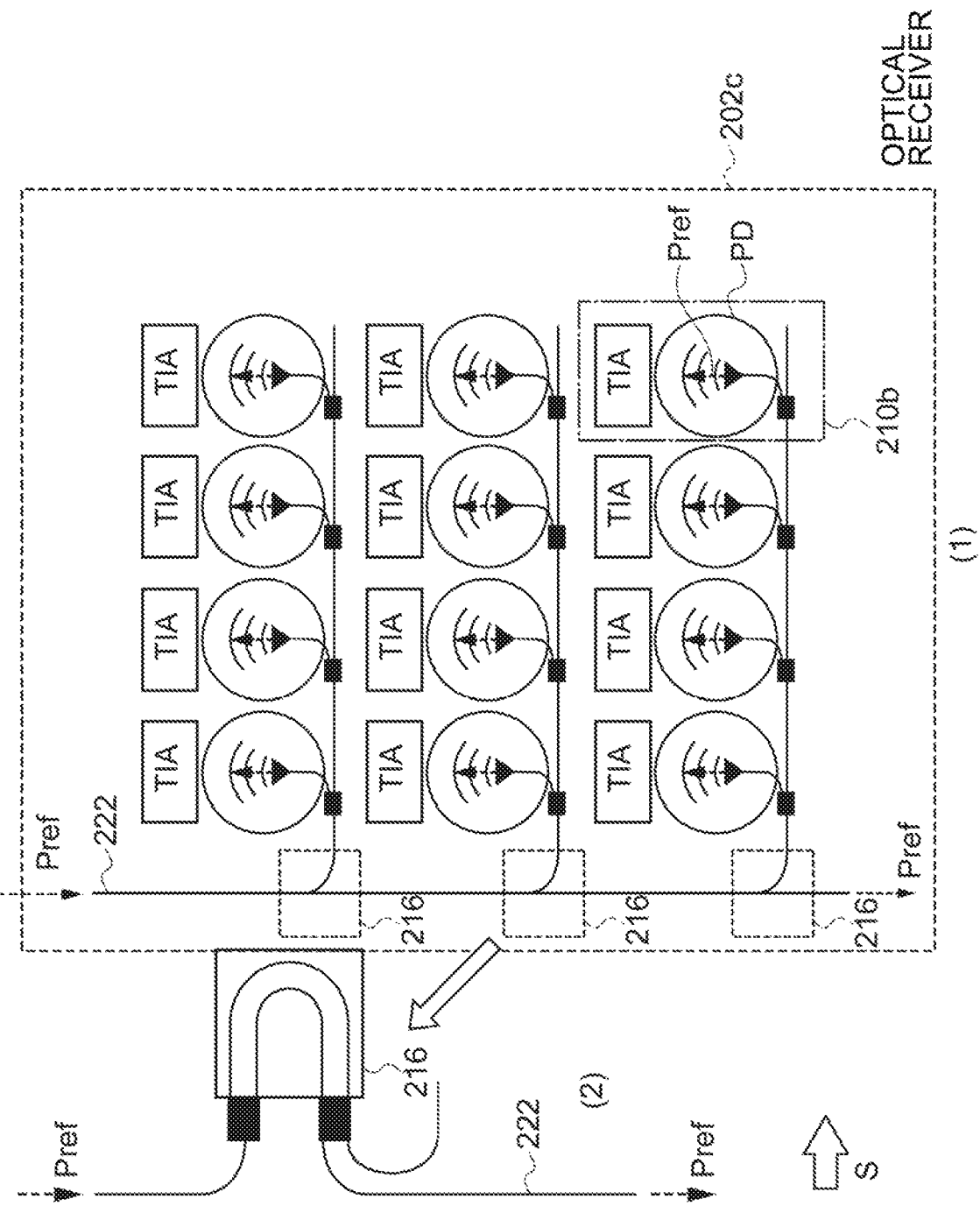
FIG. 6 is a diagram illustrating an example of a configuration of an optical receiver according to a third exemplary embodiment.
Figure 7A:
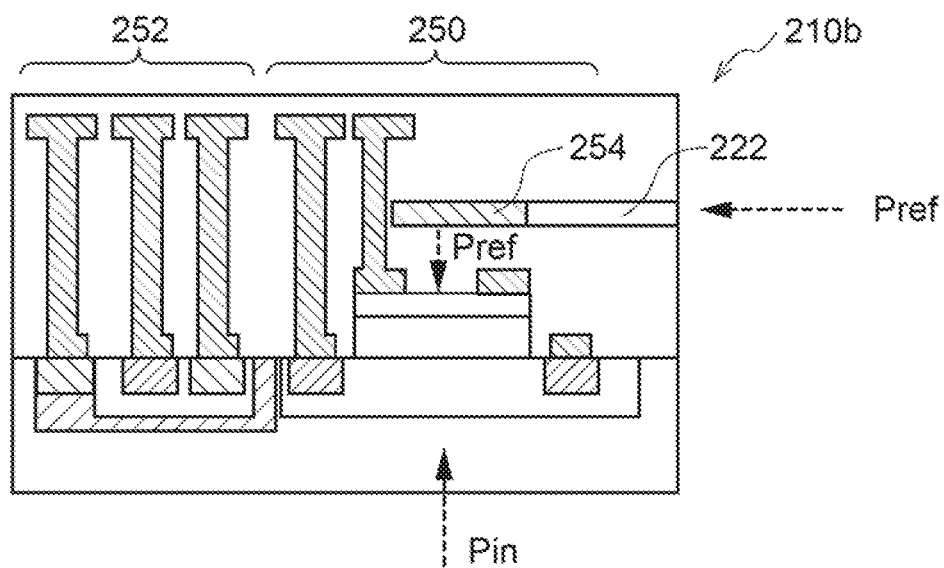
FIGS. 7A to 7C are diagrams illustrating an example of a configuration of a unit optical reception section according to the third exemplary embodiment.
Figure 7B:
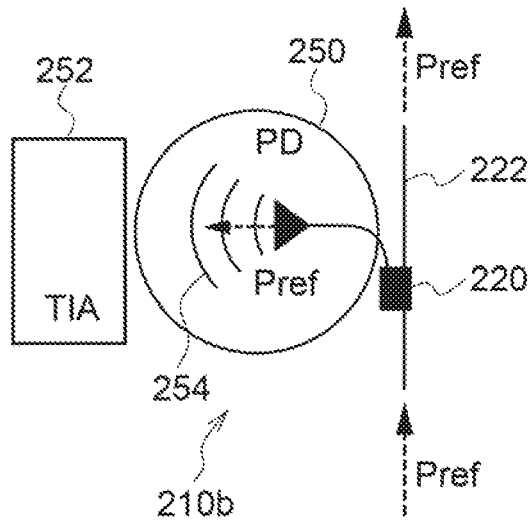
Figure 7C:
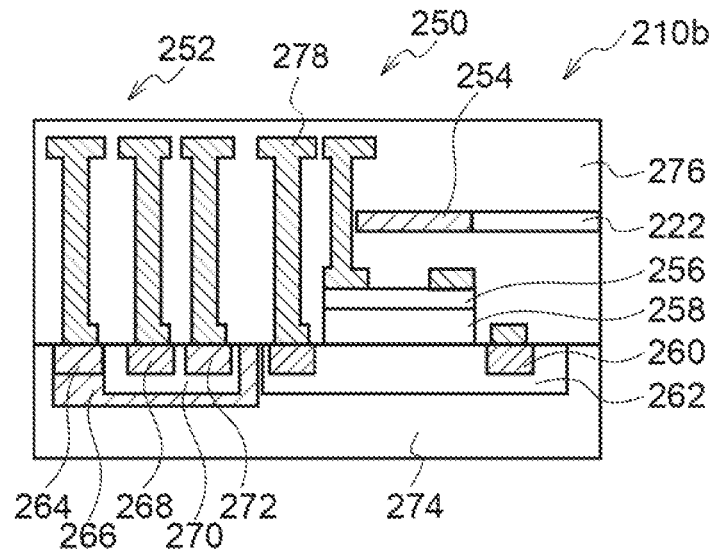
Figure 8:
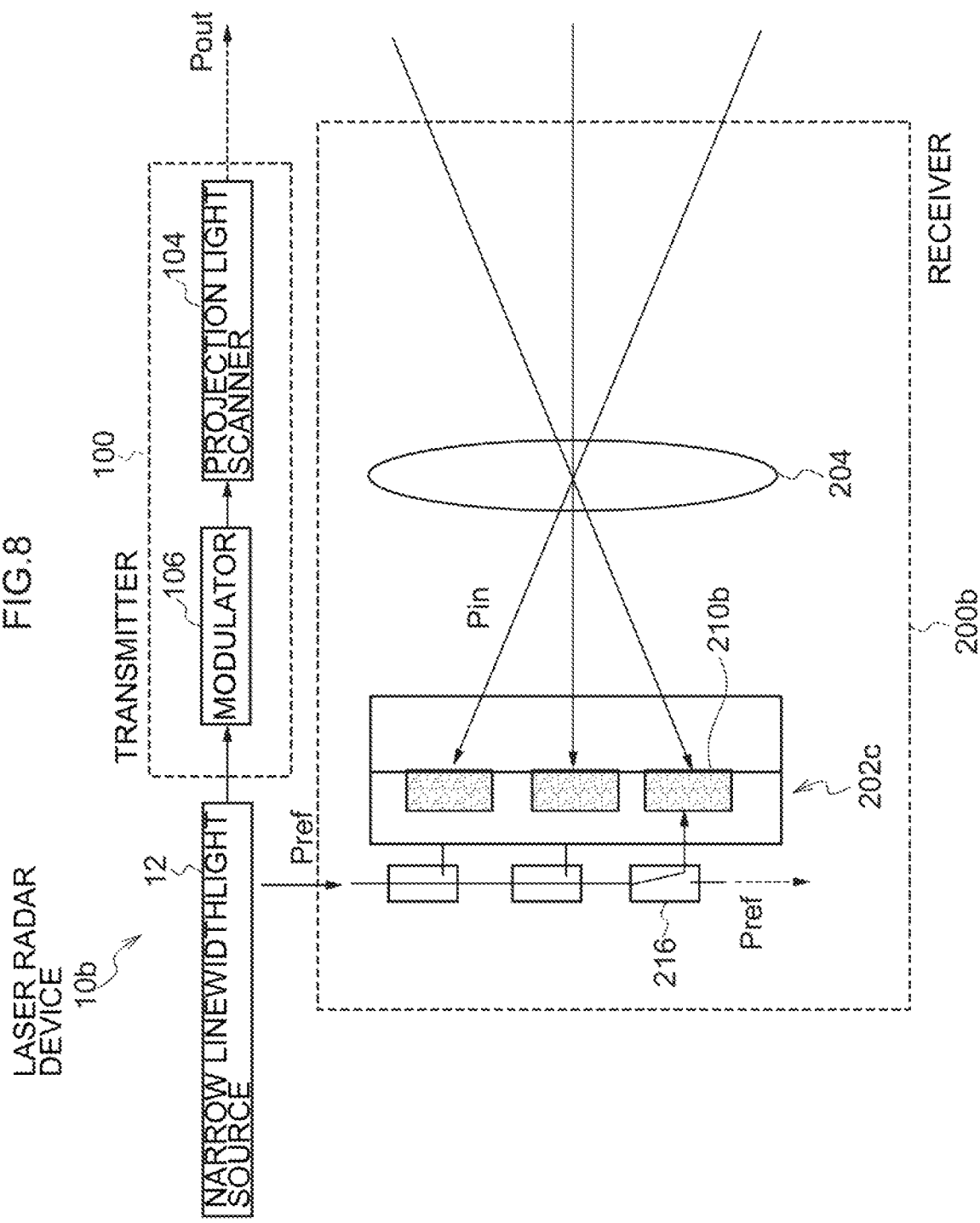
FIG. 8 is a block diagram illustrating an example of a configuration of a laser radar device according to the third exemplary embodiment.

Explanation follows regarding a laser radar device 10b according to an exemplary embodiment, with reference to FIG. 6 to FIG. 8. The present exemplary embodiment is a mode that employs an optical receiver 202c as the optical receiver 202, by employing a receiver 200b as the receiver 200 of the laser radar device 10 illustrated in FIG. 1.

As illustrated in (1) of FIG. 6, in place of the unit optical reception sections 210a of the optical receiver 202b illustrated in FIG. 5, the optical receiver 202c employs unit optical reception sections 210b that each integrate together a photodiode (PD) and a transimpedance amplifier (TIA) serving as a pre-amplifier. Configuration in which whether or not the reference light Pref is caused to be incident to the photodiodes PD is implemented by switching, using the optical switches 216 disposed at the left end of the optical receiver 202c in row units of the unit optical reception section 210b laid out in an array, is similar to that of the optical receiver 202b illustrated in FIG. 5.

Explanation follows regarding a specific configuration of the unit optical reception section 210b, with reference to FIG. 7A to FIG. 7C. As illustrated in FIG. 7A, each of the unit optical reception sections 210b includes a photodiode 250 and a TIA 252 that have been monolithically integrated together. The photodiode 250 is a photodiode that employs germanium (Ge) as a material, and, as illustrated in FIG. 7A, reception light Pin is caused to be incident thereto through a rear face (the substrate side). As illustrated in FIG. 7B, the reference light Pref is guided through the optical waveguide 222, and, after being split by the optical splitter 220, is caused to be incident from a front face of the photodiode 250, through a grating coupler 254 disposed at a leading end portion of the optical waveguide 222. The reception light Pin and the reference light Pref are mixed together by a photoelectric converter of the photodiode 250, and optical heterodyne detection is performed.

Explanation follows regarding an example of a specific configuration of each of the unit optical reception sections 210b, with reference to FIG. 7C. The photodiode 250 is formed on a substrate 274 of silicon (Si), and is configured including a P–Si region 262, a P+Si region 260, a Ge layer 258, and an N-type Ge layer 256. Herein, the P–Si region represents a region of Si doped with a low concentration of P-type impurities, and the P+Si region represents a region of Si doped with a high concentration of P-type impurities.

The TIA 252 is configured including an N–Si region 266 formed on the Si substrate 274, a P–Si region 270 and an N+Si region 264 formed within the N–Si region 266, and a P+Si region 268 and an N+Si region 272 formed within the P–Si region 270.

An $SiO_2$ layer 276 is formed to an upper portion of the photodiode 250 and the TIA 252, and the optical waveguide 222 and the grating coupler 254 are formed within the $SiO_2$ layer 276. The photodiode 250 and the TIA 252 are each connected to, for example, an electrode 278 formed from aluminum (Al) or the like.

FIG. 8 illustrates the laser radar device 10b that employs a receiver 200b (the optical receiver 202c). The optical receiver 202c illustrated in FIG. 8 is a cross-section of the optical receiver 202c illustrated in (1) of FIG. 6, as viewed along the direction of the white arrow S illustrated in (1) of FIG. 6, and four units of the unit optical reception section 210b are disposed along a direction facing into the page. The optical switches 216 switch whether or not the reference light Pref is caused to be incident to the photodiode 250 for each of the four units.

The reception light Pin corresponding to the each portion of the target object O is guided by the image-forming lens 204, and is incident to the respective photodiode 250 of the unit optical reception section 210b. The reception light Pin and the reference light Pref are mixed together according to the switching control by the optical switch 216, and optical heterodyne detection is performed.

The present exemplary embodiment employs the photodiode 250 that uses Ge, and is therefore a mode particularly applicable to, for example, cases in which a laser in a long wavelength region (for example, 1.55 μm) is employed in the narrow linewidth light source 12 (for the transmission light Pout and the reference light Pref).

Fourth Exemplary Embodiment

Figure 9A:
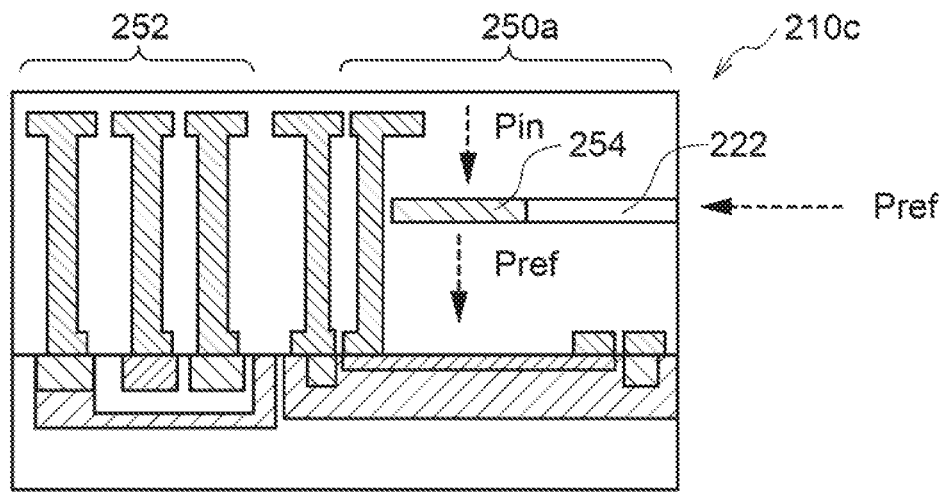
FIGS. 9A to 9C are diagrams illustrating an example of a configuration of a unit optical reception section according to a fourth exemplary embodiment.
Figure 9B:
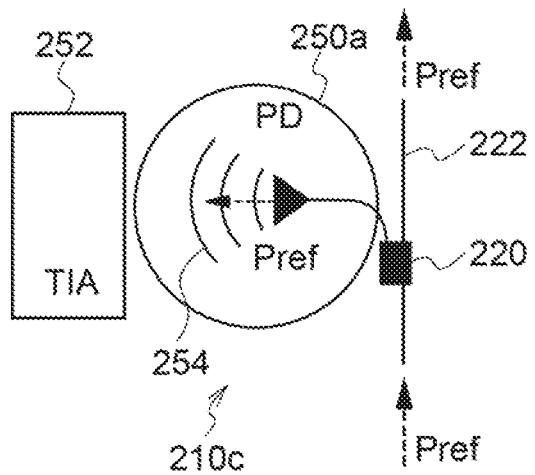
Figure 9C:
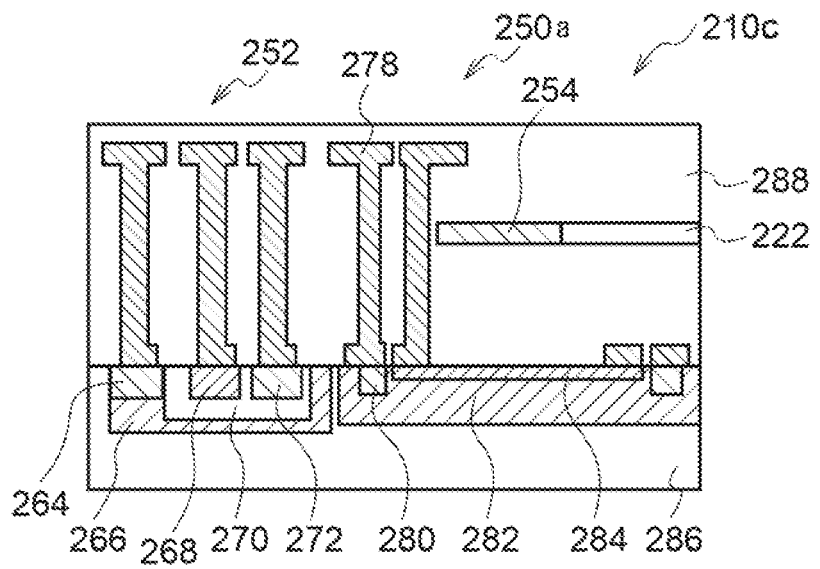

Explanation follows regarding the laser radar device 10 according to an exemplary embodiment, with reference to FIG. 9A to FIG. 9C. The present exemplary embodiment is a mode in which the unit optical reception section 210b of the optical receiver 202c of the laser radar device 10b illustrated in FIG. 8 is replaced by a unit optical reception section 210c. Configuration other than that of the unit optical reception section 210c is similar to that of FIG. 8, and explanation therefore is omitted. Explanation follows here regarding the configuration of the unit optical reception section 210c.

As illustrated in FIG. 9A, the unit optical reception section 210c is obtained by replacing the photodiode 250 of the unit optical reception section 210b illustrated in FIG. 7A to FIG. 7C with a photodiode 250a. The TIA 252 is configured similarly to the TIA illustrated in FIG. 7.

FIG. 9C illustrates an example of a specific configuration of the unit optical reception section 210c. The photodiode 250a of the unit optical reception section 210c is configured including an N–Si region 282 formed on an Si substrate 286, and an N+Si region 280 and a P+Si region 284 formed within the N–Si region 282.

An $SiO_2$ layer 288 is formed on the photodiode 250a and the TIA 252. The optical waveguide 222 is formed within the $SiO_2$ layer 288, and the grating coupler 254 is formed at a leading end portion of the optical waveguide 222. Moreover, for example, the electrode 278 that is formed from aluminum (Al) or the like is connected to each of the photodiode 250a and the TIA 252.

The reference light Pref is caused to be incident to the photodiode 250a through the optical waveguide 222 and the grating coupler 254. The reception light Pin here differs from that of the unit optical reception section 210b illustrated in FIG. 7 in that the reception light Pin here is caused to be incident from the front face of the photodiode 250a.

The present exemplary embodiment employs a photodiode 250a using Si, and is therefore a mode particularly well suited to cases in which a laser in the visible spectrum is employed in the narrow linewidth light source 12 (for the transmission light Pout and the reference light Pref).

Fifth Exemplary Embodiment

Figure 10:
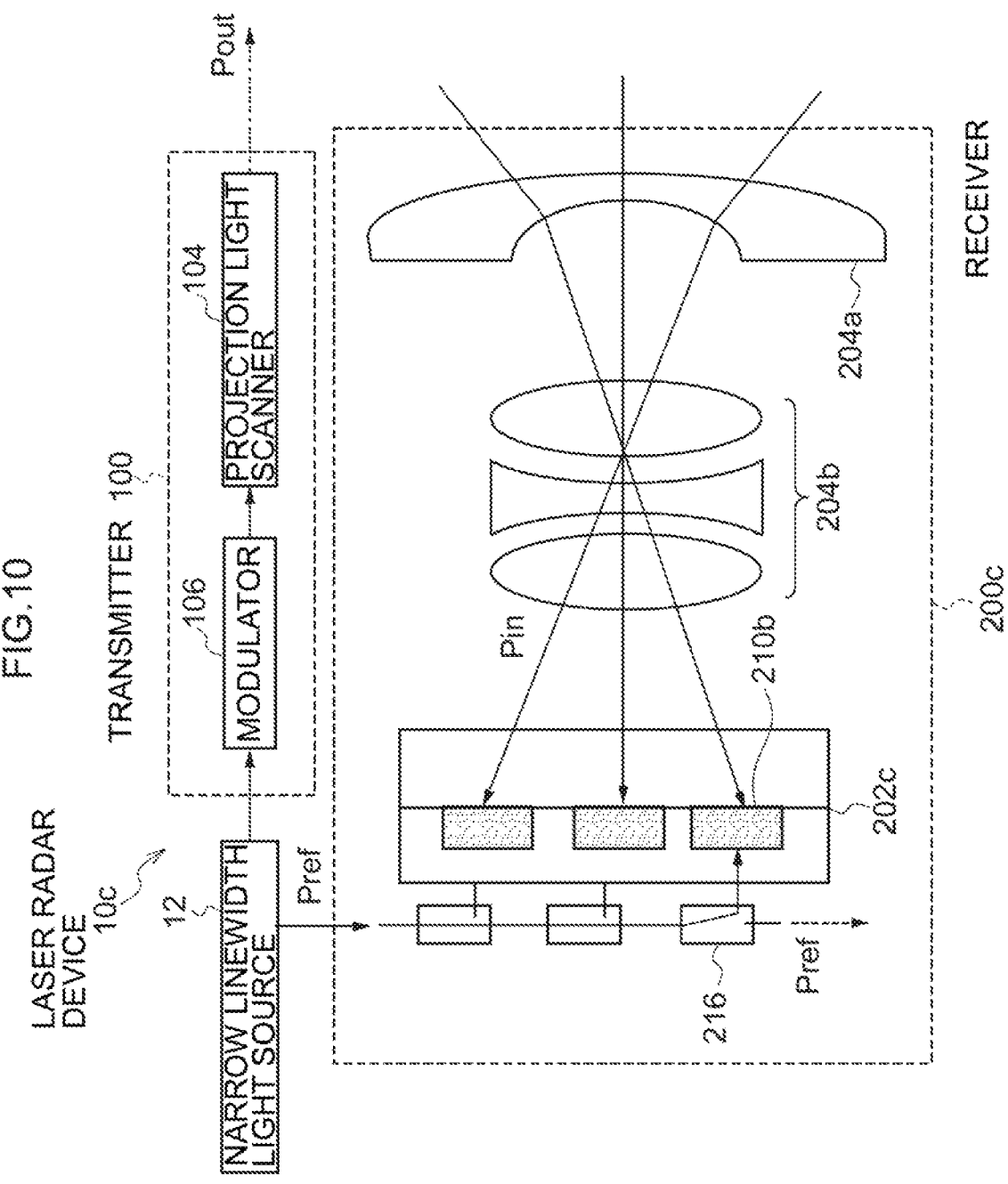
FIG. 10 is a block diagram illustrating an example of a configuration of a laser radar device according to a fifth exemplary embodiment.

Explanation follows regarding a laser radar device 10c according to an exemplary embodiment, with reference to FIG. 10. The present exemplary embodiment is a mode in which the image-forming lens 204 of the laser radar device 10b illustrated in FIG. 8 is replaced by a wide-angle lens 204a and an image-forming lens 204b. The optical receiver 202c is similar to that illustrated in FIG. 8, and explanation thereof is therefore omitted.

In the present exemplary embodiment, the wide-angle lens 204a is employed as part of the image-forming lenses. As illustrated in FIG. 8, there are limitations to the visible angle (image angle) in cases in which a single image-forming lens 204 is employed, and the reception light Pin sometimes cannot be adequately captured from a wide region target object O. The present exemplary embodiment has an increased visible angle due to the wide-angle lens 204a, and is therefore a mode effective for capturing reflected light even from wide region target objects O.

Sixth Exemplary Embodiment

Figure 11:
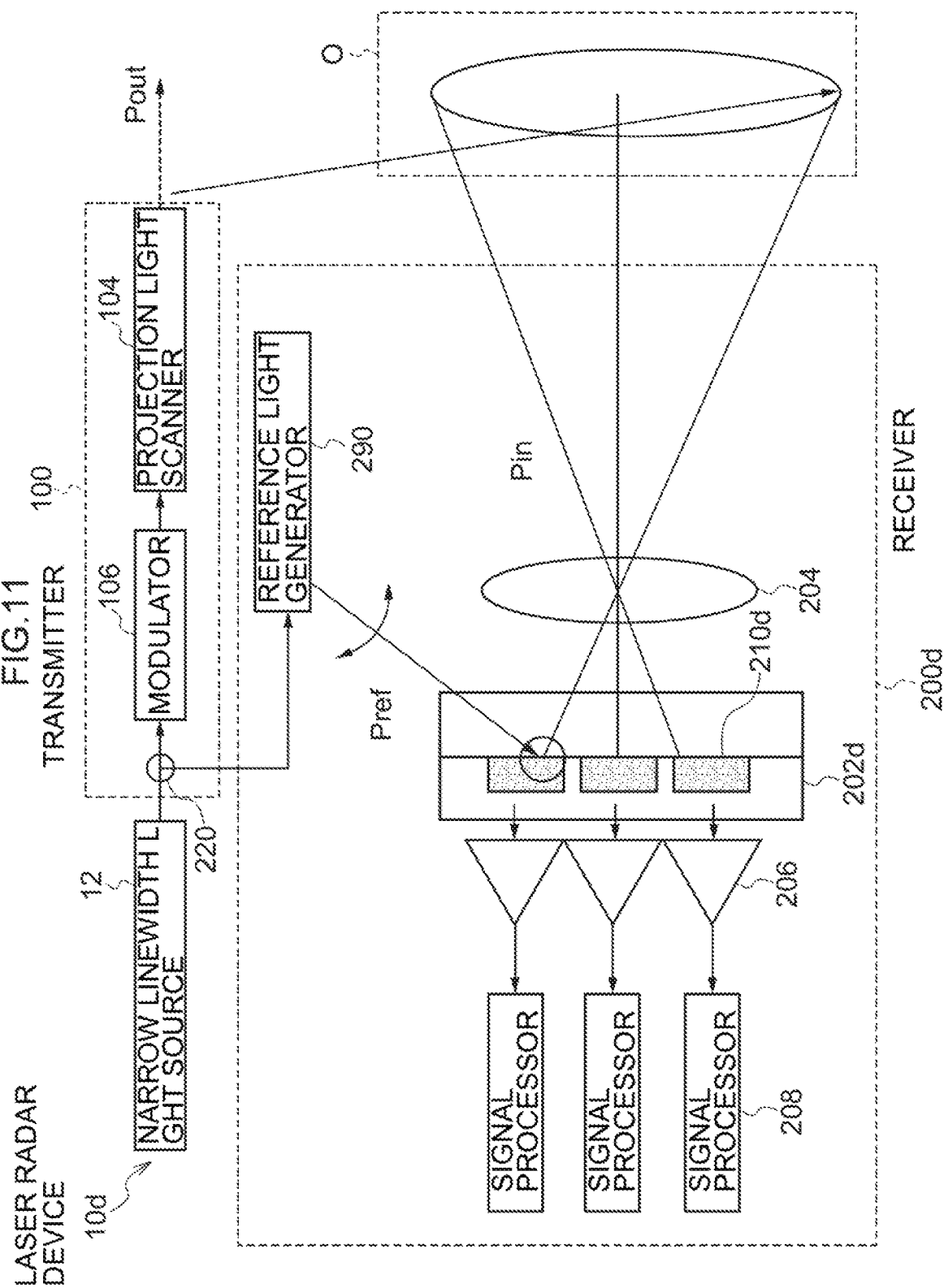
FIG. 11 is a block diagram illustrating an example of a configuration of a laser radar device according to a sixth exemplary embodiment.
Figure 12:
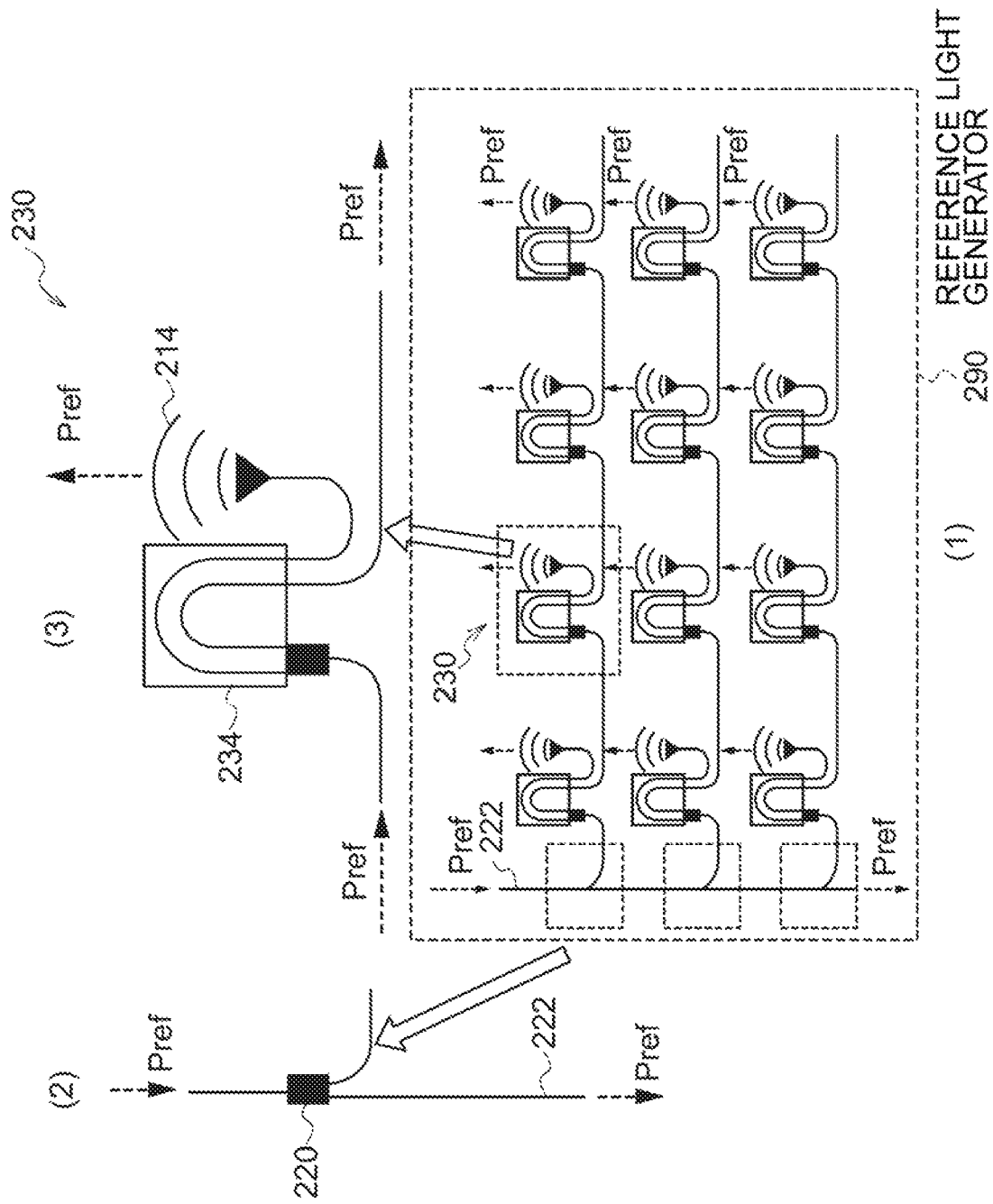
FIG. 12 is a diagram illustrating an example of a configuration of a reference light generator according to the sixth exemplary embodiment.
Figure 13:
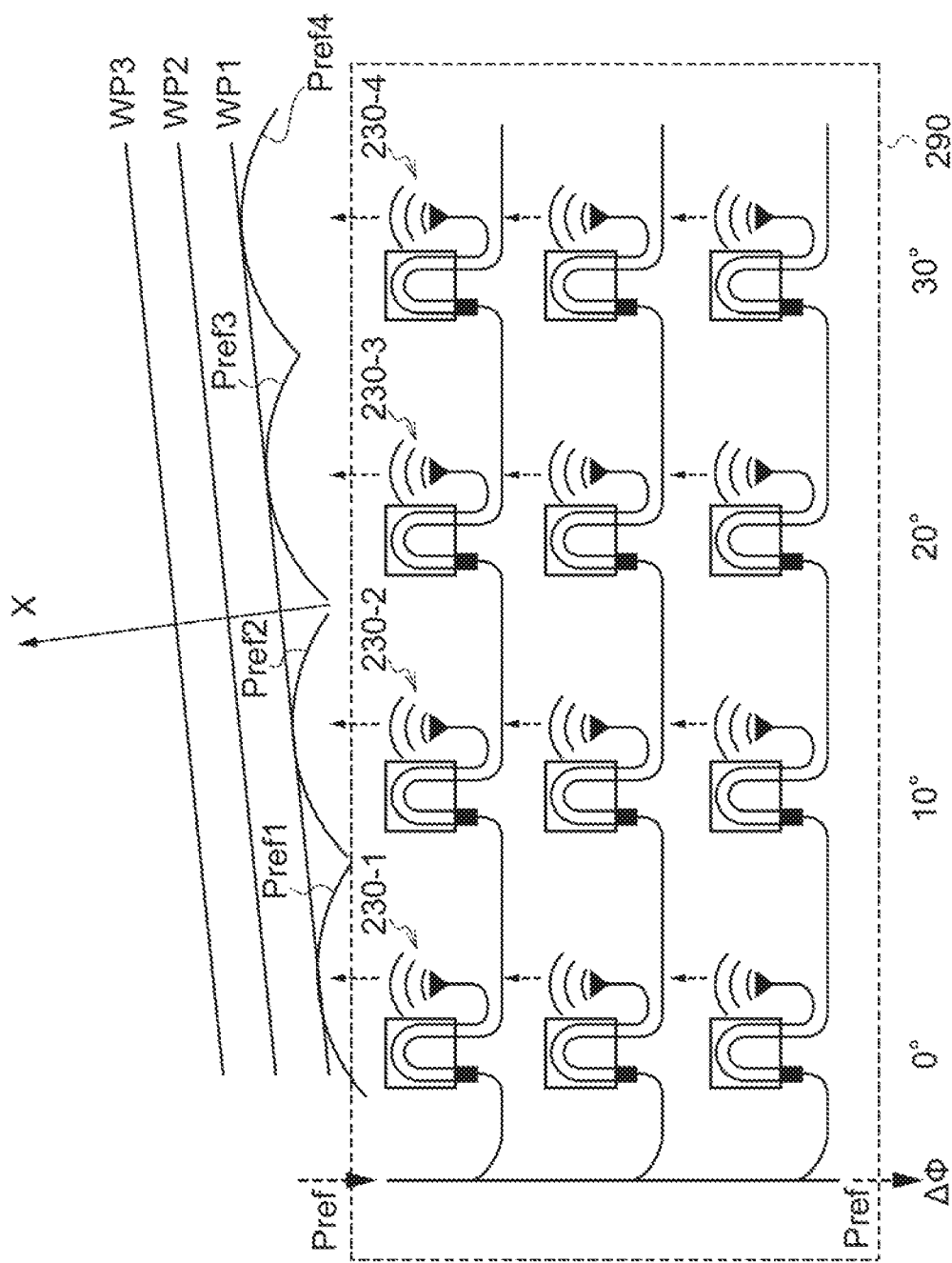
FIG. 13 is a diagram for explaining operation of a reference light generator according to the sixth exemplary embodiment.

Explanation follows regarding a laser radar device 10d according to an exemplary embodiment, with reference to FIG. 11 to FIG. 13. As illustrated in FIG. 11, the present exemplary embodiment is a mode that employs a reference light generator 290 as the reference light scanner 102 illustrated in FIG. 1, and employs a receiver 200d as the receiver 200.

Explanation follows regarding an example of a configuration of the reference light generator 290 according to the present exemplary embodiment, with reference to FIG. 12. As illustrated in (1) of FIG. 12, the reference light generator 290 is configured including plural (3×4=12 units in the example illustrated in FIG. 12) of a unit reference light generator 230. The reference light Pref from the narrow linewidth light source 12, which has been split by the optical splitter 220 illustrated in (2) of FIG. 12, is then distributed by the optical waveguide 222 and guided to each of the unit reference light generators 230. Note that there is no limitation to 12 units as the number of unit reference light generators 230 disposed in the reference light generator 290, and an appropriate number thereof may be disposed according to, for example, the light intensity required for the reference light Pref.

As illustrated in (3) of FIG. 12, each of the unit reference light generators 230 includes a grating coupler 214 and an optical phase shifter 234. The optical phase shifter 234 is provided for changing the phase of the reference light Pref, and, in the present exemplary embodiment, is configured so as to be capable of changing the phase of the reference light Pref incident to each unit reference light generator 230. The grating coupler 214 causes the reference light Pref, which has been phase-adjusted using the optical phase shifter 234, to emanate toward an optical receiver 202d.

Explanation follows regarding operation principles of the reference light generator 290 according to the present exemplary embodiment, with reference to FIG. 13. As illustrated in FIG. 13, in the reference light generator 290 according to the present exemplary embodiment, the phase of the unit reference light generators 230 is changed column-by-column. Namely, in the example illustrated in FIG. 13, the phase of the unit reference light generators 230-1 for the unit reference light generators 230 present in the same column as each other is adjusted to $\Delta\varphi=0°$. Similarly, the phase is adjusted to $\Delta\varphi=10°$ for unit reference light generators 230-2 of unit reference light generators 230 present in the same column as each other, the phase is adjusted to $\Delta\varphi=20°$ for unit reference light generators 230-3 of unit reference light generators 230 present in the same column as each other, and the phase is adjusted to $\Delta\varphi=30°$ for unit reference light generators 230-4 of unit reference light generators 230 present in the same column as each other.

In the reference light generators 290 that have been phase adjusted in this manner, as illustrated in FIG. 13, reference light Pref1, reference light Pref2, reference light Pref3, and reference light Pref4 respectively emitted from the column 230-1, the column 230-2, the column 230-3, and the column 230-4 of the unit reference light generators propagate with time offsets to each other. Wave fronts formed by the reference light Pref1, the reference light Pref2, the reference light Pref3, and the reference light Pref4 of such time offset propagate out as WP1, WP3, WP3, and so on.

It is possible to freely adjust the direction X in which the wave fronts WP propagate by adjusting the phase $\Delta\varphi$ of each of the unit reference light generators 230. Accordingly, adjusting the phase $\Delta\varphi$ of each of the unit reference light generators 230 to control the emission direction X of the reference light Pref, scans the position of the reference light Pref on the surface of the optical receiver 202d, and enables the reference light Pref to be mixed with the reception light Pin corresponding to respective portions of the target object O.

In the laser radar device 10d according to the present exemplary embodiment, there is no need to scan the reference light Pref in the optical receiver 202d since the reference light Pref is scanned in the reference light generator 290. Thus, in contrast to each of the exemplary embodiments above, there is no need to dispose optical switches in the optical receiver 202d, and the optical receiver 202d is fundamentally configured by photodiodes 212 (or, alternatively, by using the unit optical reception section 210b or the unit optical reception section 210c). This thereby enables the optical receiver 202 to be more simply configured.

Note that there is a low number of the unit optical reception sections 210 included in the optical receiver 202, and in cases in which, for example, the arithmetic processing load in the signal processor 208 is low, there is not always a need to scan the reference light Pref using switching control. There is no need to provide the optical phase shifter 234 in such cases, and it is sufficient for the reference light Pref distributed by the optical waveguide 222 to be emitted from the grating coupler 214 and emanate toward the corresponding unit optical reception section 210.

Seventh Exemplary Embodiment

Explanation follows regarding a laser radar device 10e according to an exemplary embodiment, with reference to FIG. 14. The laser radar device 10e is obtained by replacing the optical receiver 202d with an optical receiver 202e, by replacing the receiver 200d of the laser radar device 10d illustrated in FIG. 11 with a receiver 200e. The scanning of the reference light Pref is accordingly performed by the reference light generator 290.

The optical receiver 202e is configured by plural arrays of unit optical reception sections 210e. This differs from the optical receiver 202d in that plural reception lights Pin from among the reception lights Pin corresponding to respective portions of the target object O are input to a single photodiode of each of the unit optical reception sections 210e.

In the optical receiver 202e according to the present exemplary embodiment, plural input signals incident to the photodiodes of the unit optical reception section 210e need to be separated using an electrical circuit subsequent to the pre-amplifier 206; however, the number of the unit optical reception sections 210e can be reduced.

Note that configuration in which plural reception lights Pin from among the reception lights Pin corresponding to respective portions of the target object O are input to a single photodiode of the unit optical reception sections 210 is not limited to application to the present exemplary embodiment, and such a configuration may be applied to each of the above exemplary embodiments.

Eighth Exemplary Embodiment

Figure 15A:
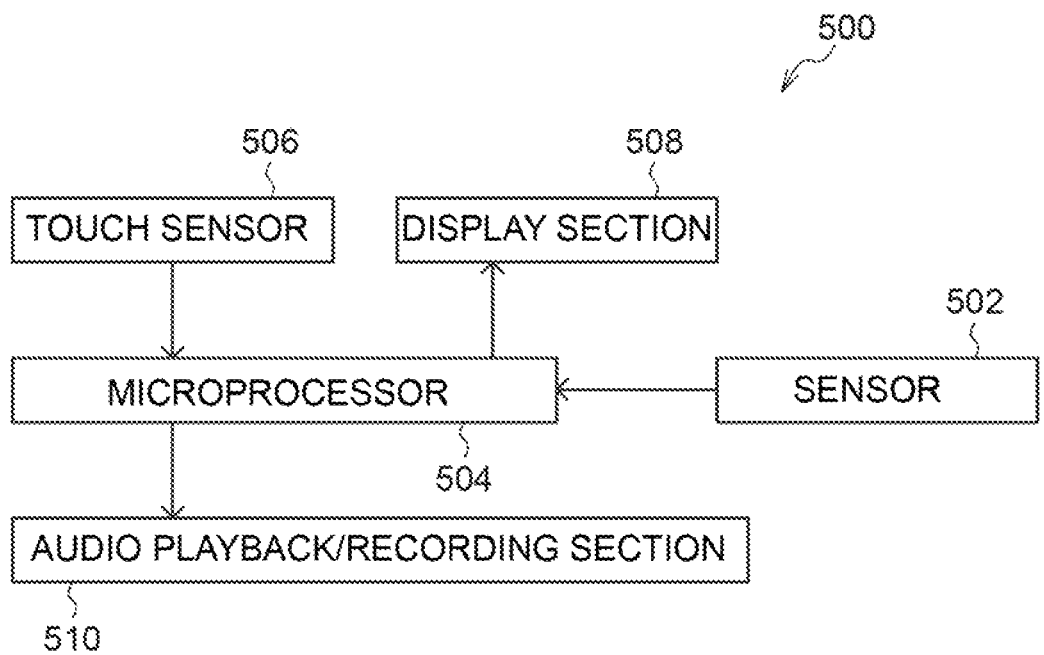
FIGS. 15A and 15B are block diagrams illustrating examples of configuration of a terminal device according to an eighth exemplary embodiment.
Figure 15B:
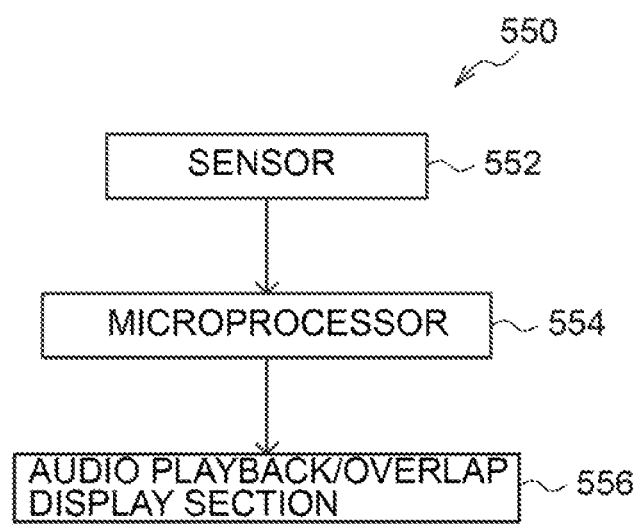

Explanation follows regarding a terminal device according to an exemplary embodiment, with reference to FIG. 15A and FIG. 15B. The present exemplary embodiment is a mode in which a laser radar device according to one of the above exemplary embodiments is applied to a tablet terminal device and a wearable terminal device that serve as examples of a terminal device.

The laser radar device according to the above exemplary embodiments is capable of measuring with high sensitivity the distance to a target object, the properties of the target object, and the like, and is capable of vibration mapping, namely, visualization of vibrations, by applying such high sensitivity measurement characteristics. The present exemplary embodiment is a mode in which the laser radar device according to the present invention is applied to a terminal device for visualizing vibrations in this manner.

FIG. 15A illustrates a tablet terminal device 500 according to the present exemplary embodiment. As illustrated in FIG. 15A, the tablet terminal device 500 includes a sensor 502, a microprocessor 504, a touch sensor 506, a display section 508, and an audio playback/recording section 510.

The sensor 502 is configured by a laser radar device according to each of the above exemplary embodiments, and is, for example, a sensor that detects sounds up to 20 kHz, namely, sounds perceptible to the human ear. The touch sensor 506 and the display section 508 configure a so-called touch panel. The audio playback/recording section 510 records and plays back detected sound. The sensor 502, the touch sensor 506, the display section 508, and the audio playback/recording section 510 are each connected to the microprocessor 504.

In the tablet terminal device 500 according to the present exemplary embodiment configured as described above, sound of a touched position of the display section 508 can be detected with high sensitivity, and the detected sound can be recorded and played back.

FIG. 15B illustrates a wearable terminal device 550 according to the present exemplary embodiment. As illustrated in FIG. 15B, the wearable terminal device 550 includes a sensor 552, a microprocessor 554, and an audio playback/overlap display section 556. The wearable terminal device 550 is, for example, configured as a spectacles-type wearable terminal device.

The sensor 552 is configured by a laser radar device according to the above exemplary embodiments, and is a sensor that detects sound, particularly sound that is imperceptible to the human ear. The audio playback/overlap display section 556 visualizes the detected sound, and displays the visualization together with an image of the target object on a display section provided to the wearable terminal device (not illustrated in the drawings). The sensor 552 and the audio playback/overlap display section 556 are each connected to the microprocessor 554.

The wearable terminal device 550 according to the present exemplary embodiment, is, for example, worn by an operator in a factory, and is a particularly effective terminal device in, for example, cases in which abnormal sound inaudible to the operator is detected.

Here, each of the above exemplary embodiments make no particular reference to the mode by which the unit optical reception section 210 or the unit reference light generator 230 is integrated. The configurations of these sections may be achieved by integrating together individual respective optical components, and the optical waveguide-type optical receiver 202 or the reference light generator 290 may be integrated by integrating the respective optical components together using optical waveguide technology.

Namely, for example, taking the optical receiver 202a (FIG. 2) as an example, the optical receiver 202a may be configured by combining the individual components of the photodiode 212, the grating coupler 214, the optical switch 216, and the optical multiplexer 218; or the photodiode 212, the grating coupler 214, the optical switch 216, and the optical multiplexer 218 may be configured as an optical waveguide-type optical receiver 202a that has been fabricated using optical waveguide technology.

The respective configurations of the laser radar devices according to each of the above exemplary embodiments are not limited to only these laser radar devices, and appropriate combinations may be made thereof. For example, although an example is given in which the optical receiver 202c illustrated in FIG. 6 is configured to switch the reference light Pref between guiding and not guiding for each row unit of the arrayed unit optical reception sections 210b, the optical switches 216 may be respectively provided for each of the unit optical reception sections 210b, and the optical receiver 202c may be configured to switch whether or not the reference light Pref is caused to be incident to each of the unit optical reception sections 210b similarly to as in the optical receiver 202a illustrated in FIG. 2.

Moreover, in the above exemplary embodiments, as an example of integration of the transmitter 100 and the optical receiver 200 according to the present exemplary embodiment, explanation has been given regarding an example of a mode in which the reference light Pref supply section (the optical waveguide 222 and the grating coupler 254) of the reference light scanner 102 and the unit optical reception section 210 are integrated (see FIG. 7, FIG. 9). However, there is no limitation thereto, and various other modes of integration may be applied. For example, a mode may be employed in which integration is achieved by subdividing and integrating into an integrated circuit corresponding to the transmitter 100 and an integrated circuit corresponding to the receiver 200, illustrated in FIG. 1. Namely, a mode may be employed in which the whole of the reference light scanner 102 is integrated by inclusion in the transmitter 100, and the optical receiver 202, the pre-amplifier 206, and the signal processor 208 are integrated by inclusion in the receiver 200. As the mode of mixing the reception light Pin with the reference light Pref in such cases, for example, a mode may be employed in which the reference light Pref distributed by the optical waveguide 222 of the reference light generator 290 illustrated in FIG. 12 is emitted from the grating coupler 214 without passing through the optical phase shifter 234, and emanates toward the corresponding unit optical reception section 210.

What is claimed is:

1. A laser radar device comprising:
   a light source;
   a projection light scanner that scans one part of light split off from emission light of the light source, and that generates transmission light for radiating onto a target object;
   an image forming section that forms a plurality of respective reception lights, from the transmission light reflected by respective locations of the target object, into an image on a single flat plane as a plurality of image-formation points;
   an optical receiver including a plurality of unit optical reception sections that are disposed at the plurality of image-formation points, and that mix each of the plurality of reception lights together with a reference light and perform optical heterodyne detection; and
   a reference light scanner that scans or distributes another part of the light split off from the emission light of the light source, and that generates the reference light for radiating onto each of the plurality of unit optical reception sections, wherein
   each unit optical reception section includes an optical multiplexer configured to superimpose one of the plurality of reception lights onto the reference light.

2. The laser radar device of claim 1, wherein the reference light scanner switches between guiding and not guiding the another part of the light using a plurality of optical switches provided between the light source and the plurality of unit optical reception sections, and generates the reference light for radiating onto the plurality of respective unit optical reception sections.

3. The laser radar device of claim 2, wherein each of the plurality of respective optical switches is provided at a respective one of the plurality of unit optical reception sections.

4. The laser radar device of claim 2, wherein the plurality of unit optical reception sections are disposed in an array on the optical receiver, and the plurality of optical switches are provided respectively at each row or at each column of the array.

5. The laser radar device of claim 1, wherein the reference light scanner includes a plurality of light emitters that emit respective distribution lights optically distributed from the other light so as to correspond to the plurality of respective unit optical reception sections, and the reference light scanner distributes the other light and generates the reference light for radiating onto the respective plurality of unit optical reception sections.

6. The laser radar device of claim 1, wherein
each of the plurality of respective unit optical reception sections further includes an optical incidence section to which the reception light is incident, and an optical detection element,
the optical multiplexer multiplexes the reception light from the optical incidence section and the reference light, and
the optical detection element receives the light multiplexed by the optical multiplexer.

7. The laser radar device of claim 1, wherein:
the reference light scanner comprises a variable phase shifter that shifts a phase of the other light split off from the emission light, according to an external signal, and a reference light generator comprising a plurality of unit reference light generators that each include a light emitter for emitting light that has been phase shifted by the variable phase shifter; and
the reference light scanner controls a direction of a wave front of multiplexed emission light emitted from the plurality of light emitters by controlling a phase shift amount in each of the plurality of variable phase shifters, and scans the emission light by switching which of the plurality of unit optical reception sections the emission light is radiated onto.

8. The laser radar device of claim 7, wherein a plurality of the unit reference light generators are disposed in an array on the reference light generator, and the plurality of variable phase shifters phase shift each row or each column of the array by a determined amount.

9. The laser radar device of claim 1, further comprising a detector that detects at least one of amplitude or phase of reception light for each of the plurality of optical receivers based on a signal optical-heterodyne detected by the optical receiver.

10. The laser radar device of claim 1, comprising a plurality of sets of the image forming section and the optical receiver.

11. The laser radar device of claim 1, wherein each of the plurality of respective unit optical reception sections mixes the plurality of respective reception lights with a corresponding reference light and performs optical heterodyne detection.

12. The laser radar device of claim 1, wherein each of the plurality of respective unit optical reception sections mixes the reference light with reception lights from a specific number of the plurality of reception lights, and performs optical heterodyne detection.

13. The laser radar device of claim 1, further comprising
an optical waveguide that distributes the another part of the light split off from the emission light of the light source to the respective unit optical reception sections, wherein
the reference light scanner scans or distributes the another part of the light via the optical waveguide.

14. An optical reception method for a laser radar device that comprises:
a light source;
a projection light scanner that scans one part of light split off from emission light of the light source, and that generates transmission light for radiating onto a target object; and
a reference light scanner that scans another part of the light split off from the emission light of the light source, and that generates reference light for radiating onto each of a plurality of unit optical reception sections, wherein
each unit optical reception section includes an optical multiplexer configured to superimpose one of the plurality of reception lights onto the reference light, the optical reception method comprising:
forming an image on a single flat plane as a plurality of image-formation points, from a plurality of respective reception lights that are the transmission light reflected by respective locations of the target object; and
mixing each of the plurality of reception lights with the reference light by superimposing each of the plurality of reception lights onto the reference light and performing optical heterodyne detection using the plurality of unit optical reception sections disposed at the plurality of image-formation points.

15. The laser radar device of claim 1, further comprising a modulator configured to modulate the one part of the light scanned by the projection light scanner.

16. The optical reception method of claim 14, wherein the laser radar device further comprises a modulator, and the method further comprises modulating, using the modulator, the one part of the light scanned by the projection light scanner.

* * * * *